(12) United States Patent
Thippavajjula et al.

(10) Patent No.: US 9,378,478 B2
(45) Date of Patent: Jun. 28, 2016

(54) SYSTEM AND METHOD FOR FACILITATING QUALITY ASSURANCE OF A SOFTWARE APPLICATION

(71) Applicant: Tata Consultancy Services Limited, Maharashtra (IN)

(72) Inventors: Venkata Sri Krishna Suman Thippavajjula, Siruseri-Tamil Nadu (IN); Vijayakumar Rajagopal, Siruseri-Tamil Nadu (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 0 days.

(21) Appl. No.: 14/491,852

(22) Filed: Sep. 19, 2014

(65) Prior Publication Data

US 2016/0086124 A1    Mar. 24, 2016

(51) Int. Cl.
G06F 9/44 (2006.01)
G06F 11/36 (2006.01)
G06Q 10/06 (2012.01)

(52) U.S. Cl.
CPC ............ G06Q 10/06395 (2013.01); G06F 8/10 (2013.01); G06F 11/36 (2013.01)

(58) Field of Classification Search
CPC ...... G06F 8/10; G06F 11/36; G06Q 10/06395
USPC ........................................................ 717/102
See application file for complete search history.

(56) References Cited

U.S. PATENT DOCUMENTS

| | | | |
|---|---|---|---|
| 7,603,653 B2 | 10/2009 | Sundararajan et al. | |
| 8,122,425 B2 | 2/2012 | Corral | |
| 8,122,426 B2 * | 2/2012 | Isom | G06F 8/10 717/102 |
| 8,219,435 B2 * | 7/2012 | Frank | G06Q 10/06 705/7.15 |
| 8,401,893 B1 * | 3/2013 | Heuler | G06Q 10/06 705/7.36 |
| 8,527,327 B1 * | 9/2013 | Lawrence | G06Q 10/103 705/7.27 |
| 8,583,465 B1 * | 11/2013 | Isamat | G06Q 10/0631 705/7.12 |
| 2003/0135481 A1 * | 7/2003 | Helmes | G06Q 10/10 |
| 2006/0149575 A1 | 7/2006 | Varadarajan et al. | |
| 2008/0140485 A1 * | 6/2008 | Williams | G06Q 10/06 705/7.37 |
| 2008/0216056 A1 * | 9/2008 | Bate | G06F 8/71 717/127 |
| 2009/0187573 A1 * | 7/2009 | Johnston | G06F 8/10 |
| 2010/0049566 A1 * | 2/2010 | Fukuoka | G06Q 10/06395 705/7.41 |
| 2012/0059687 A1 * | 3/2012 | Keyte | G06Q 10/06375 705/7.37 |

OTHER PUBLICATIONS

Asuncion et al., "An End-To-End Industrial Software Traceability Tool", ACM, 2007, 10pg.*

(Continued)

*Primary Examiner* — Ryan Coyer
(74) *Attorney, Agent, or Firm* — Ditthavong & Steiner, P.C.

(57) ABSTRACT

Disclosed is a method and system for facilitating quality assurance of a software application. A data receiving module for receiving project requirements associated with the software application. An assigning module for assigning one or more quality control managers from a plurality of quality control managers responsible for performing the quality control activities. A selection module for enabling the one or more quality control managers to select one or more review cycles and one or more phases of a plurality of phases corresponding to each review cycle. An extraction module extracts one or more parameters corresponding to each phase of the one or more phases. An update module for enabling the one or more quality control managers to update status of each quality control activity performed thereby facilitating the quality assurance of the software application.

12 Claims, 8 Drawing Sheets

(56) References Cited

OTHER PUBLICATIONS

Hardy, Greg, "Using It governance and COBIT to deliver value with IT and respond to legal, regulatory and compliance challenges", Elsevier, 2006, 7pg.*

Vuppala et al., "QUARK: A Dynamic SDLC Methodology", Proceedings of PCaPAC 2010, FRCOAA03, 3pg.*

Wortman, Krisitin, "Management of Independent Software Acceptance Test in the Space Domain: A Practitioner's View", IEEE, 2012, 9pg.*

Seapine Software, "Requirements Management with TestTrack", retrieved on Sep. 18, 2014 from Internet website http://www.seapine.com/ttrm.html, pp. 1-2.

Mindtree, "Integrated methodology for testing and quality management", retrieved on Sep. 18, 2014 from Internet website, http://www.mindtree.com/sites/default/files/mindtree-thought-posts-integrated-methodology-for-testing-and-quality-management.pdf, 12 pages.

Lockhart, "Agile Code Review—Fighting Bad Code with CodeCollaborator 7.0", Jan. 31, 2012, retrieved on Sep. 18, 2014 from Internet website http://blog.smartbear.com/sqc/agile-code-review-fighting-bad-code-with-codecollaborator-7-0/#respond, pp. 1-3.

Smart Bear, "Review Code, Documents & Artifacts—Collaborator", 2014, retrieved on Sep. 18, 2014 from Internet website http://smartbear.com/, 3 pages.

* cited by examiner

SYSTEM AND METHOD FOR FACILITATING QUALITY ASSURANCE OF A SOFTWARE APPLICATION

PRIORITY INFORMATION

This patent application does not take priority from any application.

TECHNICAL FIELD

The present subject matter described herein, in general, relates to a system and a method for facilitating quality assurance of a software application, and more particularly to the system and the method for enabling one or more quality control managers to perform quality control activities thereby facilitating the quality assurance.

BACKGROUND

It has been observed that a software application, before deployment or implementation, has to pass through an extensive review corresponding to each phase of the software development life cycle (SDLC) process. In general, the SDLC may comprise phases including requirement gathering and analysis, system analysis, system design, coding, testing, implementation, maintenance, and the like. It may be understood that each phase is reviewed by one or more quality control managers based on functional and logical requirements in order to assure quality of the software application. Since the review has become a major task in software industry, the quality of the software application may largely depend on protocols defined for the review.

It has been further observed that the conventional protocols may consist of a set of standard document templates that facilitates the one or more quality control managers to perform the review. The set of standard document templates comprising a set of review parameters defined for each phase of the SDLC. Based on the set of review parameters, the one or more quality control managers tend to disregard and thus may ignore one or more of the set of review parameters. Since each review parameter, of the set of review parameters, is essential to attain the quality of the software application, ignoring at least one of the set of review parameters may impact the quality of the software application. Thus ignorance of the set of review parameters may lead to a substandard quality of the software application.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts related to systems and methods for facilitating quality assurance of a software application and the concepts are further described below in the detailed description. This summary is not intended to identify essential features of the claimed subject matter nor is it intended for use in detecting or limiting the scope of the claimed subject matter.

In one implementation, a system for facilitating quality assurance of a software application is disclosed. In one aspect, the system may comprise a processor and a memory coupled to the processor for executing a plurality of modules present in the memory. The plurality of modules may comprise a data receiving module, a quality control manager assigning module, a selection module, an extraction module, and an update module. The data receiving module may receive project requirements associated with the software application. The assigning module may assign one or more quality control managers, from a plurality of quality control managers, responsible for performing the quality control activities. It may be understood that profile information associated with each of the plurality of quality control managers may be stored in a database. In one aspect the one or more quality control managers may be assigned by mapping the project requirements with the profile information. Based on the mapping, the one or more quality control managers may be selected for performing the quality control activities. The selection module may enable the one or more quality control managers to select one or more review cycles associated with the quality control activities to be performed corresponding to the software application. The selection module may further enable the one or more quality control managers to select one or more phases of a plurality of phases corresponding to each review cycle of the one or more review cycles. In one aspect, each phase may be associated with software development life cycle (SDLC) of the software application. The extraction module may extract one or more parameters corresponding to each phase from a master parameter list stored in the database. The one or more parameters may facilitate the one or more quality control managers to perform the quality control activities. The update module may enable the one or more quality control managers to update status of each quality control activity performed corresponding to each of the one or more parameters, in the database, thereby facilitating the quality assurance of the software application.

In another implementation, a method for facilitating quality assurance of a software application is disclosed. In one aspect, project requirements associated with the software application may be received. Upon receiving the project requirements, one or more quality control managers, from a plurality of quality control managers, may be assigned for performing the quality control activities. It may be understood that profile information associated with each of the plurality of quality control managers may be stored in a database. In one aspect the one or more quality control managers may be assigned by mapping the project requirements with the profile information and accordingly selecting the one or more quality control managers for performing the quality control activities based on the mapping. Subsequent to the assigning of the one or more quality control managers, the one or more quality control managers may be enabled to select one or more review cycles associated with the quality control activities to be performed corresponding to the software application. The one or more quality control managers may further enabled to select one or more phases, of a plurality of phases, corresponding to each review cycle of the one or more review cycles. In one aspect, each phase may be associated with software development life cycle (SDLC) of the software application. Further, one or more parameters corresponding to each phase may be extracted from a master parameter list stored in the database. The one or more parameters may facilitate the one or more quality control managers to perform the quality control activities. Subsequent to the extraction of the one or more parameters, the one or more quality control managers may be enabled to update status of each quality control activity performed corresponding to each of the one or more parameters, in the database, thereby facilitating the quality assurance of the software application. In one aspect, the aforementioned method for facilitating the quality assurance is performed by a processor using programmed instructions stored in a memory In yet another implementation, non-transitory computer readable medium embodying a program executable in a computing device for facilitating quality assurance of a software application is disclosed. The program may comprise a program code for receiving project requirements associated with the software application. The program may further comprise a program code for assigning one or more quality control managers from a plurality of quality control managers responsible for performing the quality control activities. It may be understood that profile information associated with each of the plurality of quality control managers may be stored in a database. In one aspect, the one or more quality control managers may be assigned by mapping the project requirements with the profile information and selecting the one or more quality control managers for performing the quality control activities based on the mapping. The program may further comprise a program code for enabling the one or more quality control managers to select one or more review cycles associated with the quality control activities to be performed corresponding to the software application. The one or more quality control managers may further enabled to select one or more phases of a plurality of phases corresponding to each review cycle of the one or more review cycles. In one aspect, each phase may be associated with software development life cycle (SDLC) of the software application. The program may further comprise a program code for extracting one or more parameters corresponding to each phase from a master parameter list stored in the database. The one or more parameters may facilitate the one or more quality control managers to perform the quality control activities. The program may further comprise a program code for enabling the one or more quality control managers to update status of each quality control activity performed corresponding to each of the one or more parameters, in the database, thereby facilitating the quality assurance of the software application.

BRIEF DESCRIPTION OF THE DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

FIGS. 3, 4, and 5(a) 5(b), 5(c) & 5(d) illustrates an example, in accordance with an embodiment of the present disclosure.

DETAILED DESCRIPTION

Figure 1:
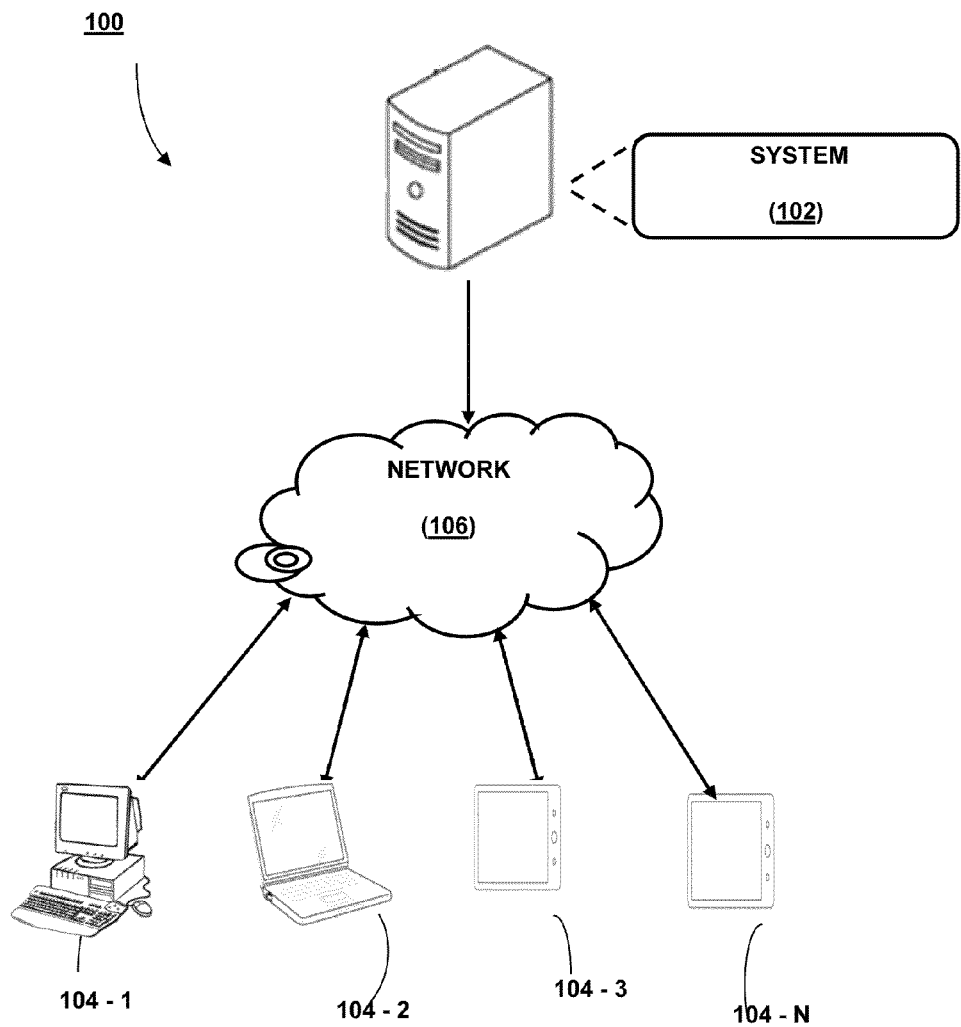
FIG. 1 illustrates a network implementation for facilitating quality assurance of a software application is shown, in accordance with an embodiment of the present disclosure.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

System and method for facilitating quality assurance of a software application is described. The software application includes a plurality of segments of software development life cycle (SDLC) that necessitate review of each segment in order assure the quality before the software application is deployed. Examples of the plurality of segments may include, but not limited to, requirement gathering and analysis, system analysis, system design, coding, testing, implementation, maintenance, and the like. The quality of each segment may be assured based on pre-defined quality procedures. In one example, the quality of a segment corresponding to coding of the software application may be assured by measuring the efficiency of programming code written in a programming language. In one aspect, the quality of the programming code may be measured upon executing the programming code under various test scenarios. The quality may further be measured based on creation of reusable components like functions or code snippets. The reusable components indicate that once the functions or the code snippets are defined may be called as and when required in other parts of the software application. This may facilitate to enhance the efficiency of the software application since the reusable components reduces the overall execution time and thus facilitates to enhance the quality of the software application.

In one aspect, the software application may be assured by one or more quality control managers. Examples of the one or more quality control managers may include, but not limited to, senior technical expert, senior design experts, senior developers, and the like. In one aspect, each of the one or more quality control managers may perform quality control activities in order to assure the quality of the software application. In one aspect, the quality control activities may include review pertaining to each phase that has been assigned to one or more quality control managers. In one aspect, a quality control manager utilizes his/her experience on technology and standards across each segment of the SDLC.

In order to review each segment, the quality control manager corresponding to each phase may be assigned as per project requirements associated to the software application. It may be understood that the quality control manager may be assigned based on a pre-defined criteria that may include application type, domain type, functional knowledge of the quality control manager, and the like. In one example, the software application associated to a banking domain may be assigned with the quality control manager who is having domain knowledge on finance as well as the technological background of Java/J2ee or Dot (.) net used in the development of the software application.

The main objective of the quality control manager is to assure, before deployment, that each phase of the software application have been complied in accordance with a set of standards and review processes as defined in order to assure the quality of the software application. The set of standards and review processes indicates one or more review cycles and one or more phases of a plurality of phases corresponding to each review cycle of the one or more review cycle associated with the quality control activities. Example of the one or more phases may include, but not limited to, a design traceability phase, wireframe phase, user interface phase, content management system (CMS) phase, java, service integration phase, and the like. The set of standards and review processes further indicates one or more parameters extracted, corresponding to each phase of the SDLC, from a master parameter list. The one or more parameters facilitate the quality control manager to perform the quality control activities. For example, if the quality control manager is reviewing a HTML/CSS phase, predefined standards or parameters associated to HTML/CSS may be extracted, from a database, as a reference for the quality control manager during the review. In order to further explain the example, consider the HTML/CSS phase is to be reviewed by the quality control manager, predefined standards from World Wide Web Consortium (W3C) corresponding to the HTML/CSS phase (and also any application specific standards as decided by the quality control manager) are pre-defined and may be retrieved during review process. In one aspect, the quality control manager updates status of each quality control activity, upon completion of the quality control activities, in order to trace the status of the quality control activities being performed.

Upon completion of the quality control activities, a signoff may be received from at least one stakeholder. In one embodiment, the stakeholder may be one of a project manager, team lead, a customer, a software developer, and the like. The signoff indicates the software application is complied with the set of standards and the review processes. Thus, in this manner, the each phase of the software application may be traced and thereby assuring the quality of the software application before the deployment of the software application.

In one embodiment, the systems and methods of the present disclosure may be capable of computing effectiveness of each quality control manager. The effectiveness indicates or quantifies the quality control activities performed by each quality control manager. In an embodiment, the effectiveness is computed based upon total defects encountered and total project effort as below:

Actual Value=(Total Defect due to coded or designed incorrectly/Total Project Effort)*100

Further, a baseline value or a threshold value corresponding to aforementioned actual value may be predefined by the project manager or the other stakeholder of the project. In an embodiment, the baseline value is based upon allowable defect count corresponding to the project effort as below:

Baseline Value=Allowable defect count based on the project effort(any Project manager may determine based on technology or past experience)

In one embodiment, if Actual Value≤Baseline value, the effectiveness is considered to be exceeding and/or meeting expectations associated with the quality control activities, whereas if Actual Value>Baseline value, the effectiveness is considered failing to exceed and/or meet expectations associated with the quality control activities. The outcome of the effectiveness (i.e. meeting or failure to meet expectations) may be indicated with colors on the user interface, the stakeholders are aware about the capabilities of each quality control manager.

While aspects of described system and method for facilitating quality assurance of a software application may be implemented in any number of different computing systems, environments, and/or configurations, the embodiments are described in the context of the following exemplary system.

Referring now to FIG. 1, a network implementation 100 of a system 102 for facilitating quality assurance of a software application is disclosed. In one aspect, the system 102 receives project requirements associated with the software application. Upon receiving the project requirements, the system 102 assigns one or more quality control managers, from a plurality of quality control managers, for performing the quality control activities. It may be understood that profile information associated with each of the plurality of quality control managers may be stored in a database. In one aspect, the one or more quality control managers may be assigned by mapping the project requirements with the profile information and selecting the one or more quality control managers for performing the quality control activities based on the mapping. Subsequent to the assigning of the one or more quality control managers, the system 102 enables the one or more quality control managers to select one or more review cycles associated with the quality control activities to be performed corresponding to the software application. The system 102 further enables the one or more quality control managers to select one or more phases of a plurality of phases corresponding to each review cycle of the one or more review cycles. In one aspect, each phase may be associated with software development life cycle (SDLC) of the software application. The system 102 extracts one or more parameters corresponding to each phase from a master parameter list stored in the database. The one or more parameters facilitate the one or more quality control managers to perform the quality control activities. Subsequent to the extraction of the one or more parameters, the system 102 enables the one or more quality control managers to update status of each quality control activity performed corresponding to each of the one or more parameters, in the database, thereby facilitating the quality assurance of the software application.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, a cloud-based computing environment and the like. In one implementation, the system 102 may comprise the cloud-based computing environment in which the user may operate individual computing systems configured to execute remotely located applications. It will be understood that the system 102 may be accessed by multiple users through one or more user devices 104-1, 104-2 . . . 104-N, collectively referred to as user 104 hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
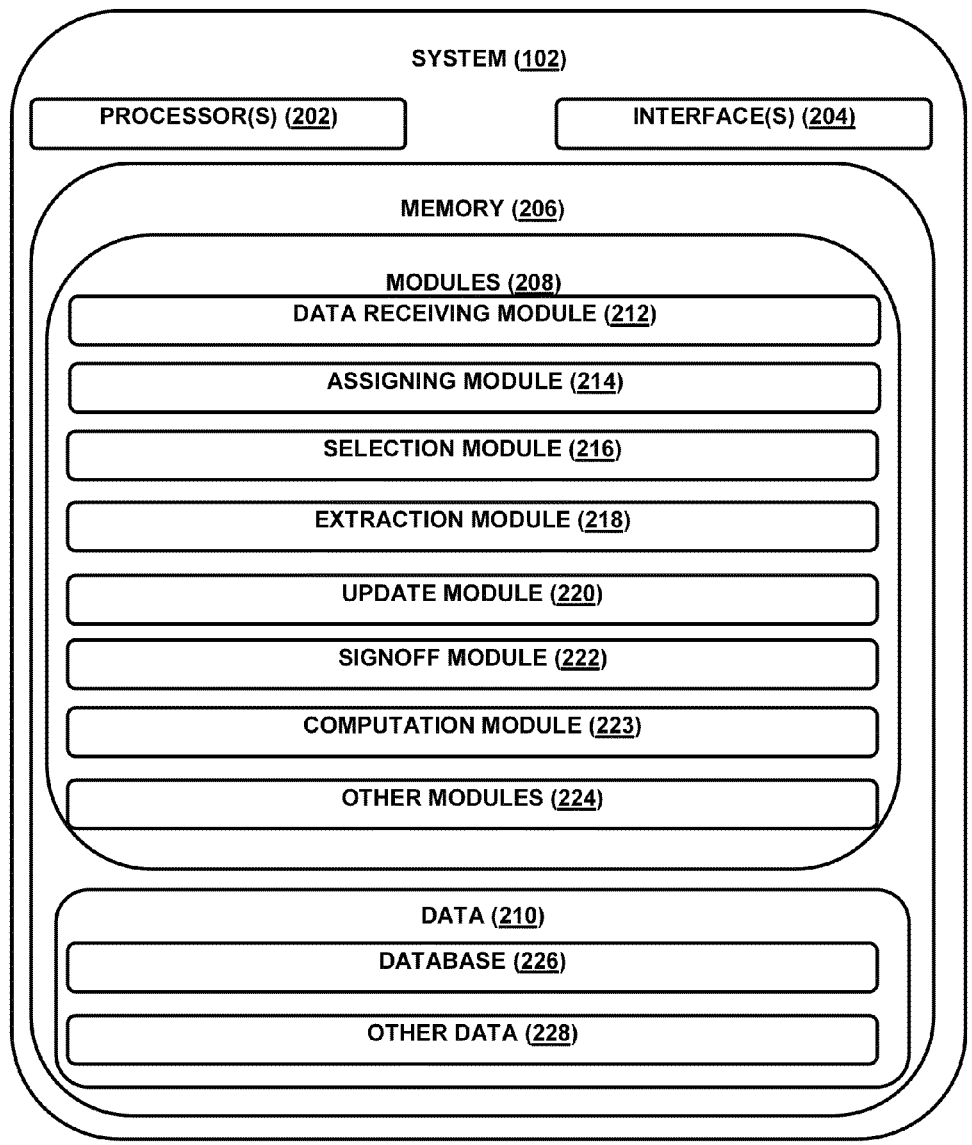
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user devices 104 also hereinafter referred to as client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a data receiving module 212, an assigning module 214, a selection module 216, an extraction module 218, an update module 220, a signoff module 222, a computation module 223 and other modules 224. The other modules 224 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a database 226 and other data 228. The other data 228 may include data generated as a result of the execution of one or more modules in the other modules 224.

In one implementation, at first, a user may use the client devices 104 to access the system 102 via the I/O interface 204. The user may register themselves using the I/O interface 204 in order to use the system 102. In one aspect, the user may accesses the I/O interface 204 of the system 102 for facilitating quality assurance of a software application. In order to facilitate the quality assurance, the system 102 may employ the plurality of modules i.e. the data receiving module 212, the assigning module 214, the selection module 216, the extraction module 218, the update module 220, the signoff module 222, and the computation module 223. The detailed working of the plurality of modules is described below.

Further referring to FIG. 2, initially, the data receiving module 212 may receive project requirements associated with the software application. The project requirements may include, but not limited to, application type, domain type and technological platform details. The application type indicates a web based application, a window based application, a mobile application, and the like. The domain type indicates that the software application may be associated to at least one of Banking, Financial Services and Insurance (BFSI) domain, a health care domain, retail domain, E-commerce domain, telecom domain, and the like. Further, the technological platform details indicate the technology used for developing the software application. Examples of the technological platform details may include, but not limited to, Java, Dot (.) net, Sql, MySql, Hibernate, Struts, JSP, Servlets, SQL (Structured Query Language) Server 2008, and the like.

In one example, consider a software application associated to the BFSI domain, hereinafter referred to as BFSI software application, is to be reviewed for the quality assurance. The data receiving module 212 receives the project requirements pertaining to the BFSI software application. It may be understood that the BFSI software application is a web based application hosted on a centralized server. Since the domain type of the BFSI software application is the BFSI, the quality assurance may be performed keeping into consideration that a person involved for assuring the quality should have domain knowledge of banking and finance. The domain knowledge facilitates to understand functional behavior of the BFSI software application. In addition to the application type, domain type, the technological platform details pertaining to the BFSI software application may also be received. In one aspect, the technological platform details comprise Java programming language for developing business logic of the BFSI software application, HTML programming language for developing user interface of the BFSI software application, and SQL programming language for maintaining backend database of the BFSI software application. The project requirements including the application type, domain type and technological platform details may be stored in a database 226.

In one aspect, upon storing, the project requirements may be retrieved from the database 226. Based on the project requirements, one or more quality control managers, from a plurality of quality control managers, may be assigned for performing the quality control activities associated with the quality assurance of the software application (BFSI software application in this case). It may be understood that before assigning the one or more quality control managers, profile information pertaining to each of the one or more quality control managers may be stored in the database 226. The profile information indicates expertise of the one or more quality control managers in the domain knowledge along and the technological platform details. In one aspect, the profile information may comprise name of a quality control manager, primary skill set, and secondary skill set. The primary skill set and the secondary skill set may be at least one of, but not limited to, Java, J2EE, SQL, Struts, Hibernate, Dot net, HTML, XML, FTL, RSS, and the like.

Figure 3:
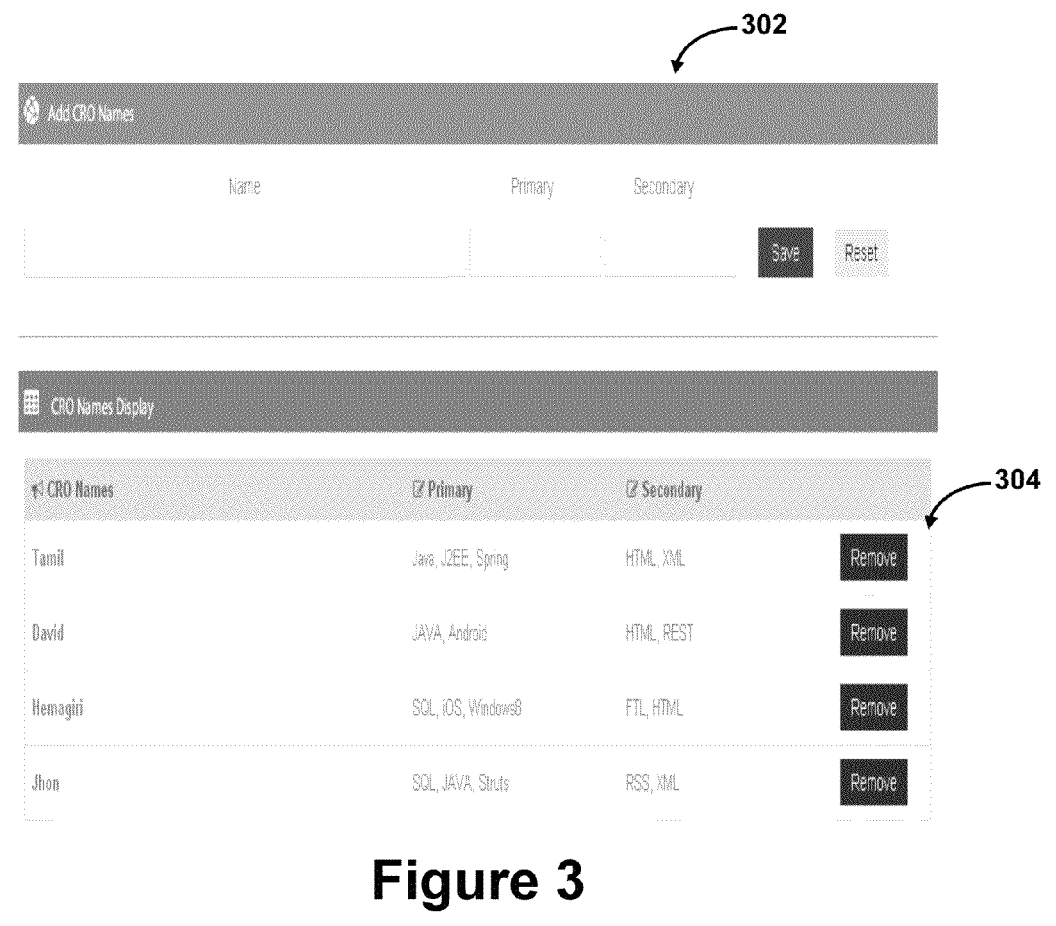

In order to understand the working of the assigning module 214, consider an example as illustrated in FIG. 3 depicting quality assurance process corresponding to the BFSI software application. In order to assign a quality control manager, of the plurality of quality control managers, for performing the quality control activities, the assigning module 214 may store the profile information of the plurality of quality control managers, hereinafter referred to as Code Review Officer (CRO), in the database 226. As illustrated in the FIG. 3, a first block 302 representing a set of data fields that enables an administrator to enter Name of the CRO in name data field. The first block 302 further enables the administrator to enter primary skill set and secondary skill set of the CRO in primary skill set data field and secondary skill set data field respectively. Upon entering the profile information, the first block 302 may further prompt the administrator to store the profile information corresponding the quality control manager in the database 226 by clicking on 'Save' button. It may further be understood that the administrator may click 'Reset' button to clear all the data fields including the name data field, the primary skill set data field, and the secondary skill set data field, and override the details of new CRO or update the details of the existing CRO.

Subsequent to the storing of the profile information, the administrator may further be enabled to view a list of the CRO along with the profile information as shown in block 304. It may be observed from the block 304 that Tamil, David, Hemagiri, and Jhon are the CROs having the primary skill set as Java J2EE Spring, Java Android, SQL iOS Windows8, and SQL Java Struts respectively. It may further be observed that Tamil, David, Hemagiri, and Jhon have the secondary skill set as HTML XML, HTML REST, FTL HTML, and RSS XML respectively. It may further be observed that the administrator may remove at least one of the CRO from the CRO list by clicking on the 'Remove' button located corresponding to each of the CRO in the list. Thus, in this manner, the assigning module 214 stores the profile information of each quality control manager responsible for performing the quality control activities.

Upon storing the profile information, the assigning module 214 may further assigns the one or more quality control managers for performing the quality control activities corresponding to the software application. In one aspect, the one or more quality control managers may be assigned by mapping the project requirements with the profile information corresponding to each of the plurality of quality control managers listed in the block 304. It may be understood that the project requirements are mapped with the profile information by correlating the projects requirements with the profile information i.e. the primary skill set and the secondary skill set of each of the plurality of quality control managers. Based on the mapping, the one or more quality control managers of the plurality of quality control managers may be selected for performing the quality control activities. In one aspect, the one or more quality control managers may be selected since the primary skill set or the secondary skill set may be correlated with the project requirements of the software application.

In order to understand the working of the assigning module 214 for assigning the one or more control managers, consider the same example of the BFSI software application being quality assured as described above. In an embodiment, consider that the project requirements of the BFSI software application comprises Java programming language for developing business logic of the BFSI software application, HTML programming language for developing user interface of the BFSI software application, and SQL programming language for maintaining backend data of the BFSI software application. Based upon these project requirements, the one or more quality control managers listed in the block 304 are selected. It is observed that, since the primary skill set and the secondary skill set of Tamil, David, Hemagiri, and Jhon are mapping with the project requirements of the BFSI software application, Tamil, David, Hemagiri, and Jhon are selected as CROs for performing the quality control activities with respect to the BFSI software application. Thus, in this manner, the assigning module 214 assigns the one or more quality control managers for performing the quality control activities for the BFSI software application.

Subsequent to the assigning, the selection module 216 may enable the one or more quality control managers to select one or more review cycles associated with the quality control activities to be performed corresponding to the software application. Upon selection of the one or more cycles, the selection module 216 may further enable to extract the one or more phases, stored in the database 226, based on the project requirements of the software application. Based on the extraction, the selection module 216 may further enable to select one or more phases of a plurality of phases corresponding to each review cycle of the one or more review cycles. In one aspect, the one or more phases may be displayed on a user interface enabling the one or more quality control managers to select the one or more phases to be review in a review cycle of the one or more review cycles. Examples of the one or more phases may include, but not limited to, design traceability phase, wireframe phase, user interface phase, content management system (CMS) phase, java, service integration phase. It may be understood that each phase may be associated with software development life cycle (SDLC) of the software application. In one aspect, the one or more review cycles indicates that the one or more phases are to be reviewed in a cycle, represented by a cycle index number, of the one or more cycles selected by the one or more quality control managers.

Figure 4:

In order to further explain selection of the phases using the selection module 216, reference is made to an example as illustrated in FIG. 4. It may be observed that the FIG. 4 illustrates a user interface displaying a project name data field and a CRO name data field. The project name data field indicates a software application for which the quality control activities are to be performed and the CRO name data field indicates name of a quality control manager, hereinafter referred to as CRO in this example, assigned for performing the quality control activities associated with the software application. In order to perform the quality control activities, initially, the selection module 216 enables the CRO to select review cycles. The CRO may have an option to select the review cycles within a range of 1 to 5. Since the CRO has selected 5 review cycles, the selection module 216 extracts design traceability phase, wireframe phase, user interface phase, content management system (CMS) phase, java, service integration phase (as the one or more phases) from the database 226 based on the project requirements of the software application. The one or more phases, as aforementioned, may facilitate the CRO to review based on pre-defined standards. In one aspect, the CRO may select the traceability phase, the content management system (CMS) phase in the review cycle 1, and the wireframe phase, the user interface phase in the review cycle 2. In another aspect, the CRO may select the user interface phase in the review cycle 1, the traceability phase, the content management system (CMS) phase in the review cycle 2, and the java, the service integration phase in the review cycle 3. In one aspect, the CRO stores the criteria of reviewing in the database 226 for future reference.

Subsequent to the selection, the extraction module 218 extracts one or more parameters corresponding to each phase from a master parameter list stored in the database 226. The one or more parameters may facilitate the one or more quality control managers to perform the quality control activities. In one aspect, the extraction module 218 may extract the pre-defined standards from the master parameter list for the reference of the one or more quality control managers. In one example, when the CRO selects the user interface phase in a review cycle, the pre-defined standards (in form of one or more parameters), corresponding to the user interface phase, such as HTML or CSS are extracted from the master parameter list for the reference of the CRO while reviewing the user interface phase. Similarly, in other embodiment, the pre-defined standards (in form of one or more parameters) corresponding to the other phases may be extracted from the master parameter list stored in the database 226.

Figure 5A:
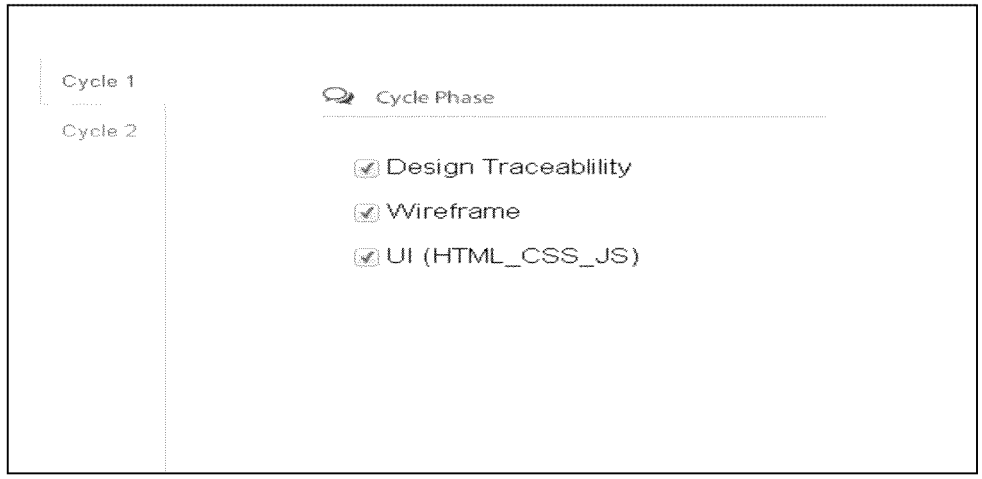
Figure 5B:

After the extracting of the one or more parameters, the update module 220 may enable the one or more quality control managers to update status of each quality control activity being performed. The status of each quality control activity may be updated in the database 226. Since the status of each quality control activity corresponding to each phase is updated upon performing the quality control activities, the status of the quality control activities may be traced through the user interface as illustrated in FIG. 5(a). In one aspect, upon performing the quality control activities, the signoff module 222 may receive a signoff from at least one stakeholder. The signoff indicates completion of the quality control activities performed by the one or more quality control managers corresponding to each cycle as illustrated in FIG. 5(b). Thus, in this manner, the quality of the software application may be assured.

In one embodiment, the computation module 223, after receiving the signoff, may be capable of computing effectiveness of each quality control manager. The effectiveness indicates or quantifies the quality control activities performed by each quality control manager. In one embodiment, the effectiveness is computed based upon total defects encountered and total project effort as below:

Actual Value=(Total Defect due to coded or designed incorrectly/Total Project Effort)*100 (1)

Further, a baseline value or a threshold value corresponding to aforementioned actual value may be predefined by the project manager or the other stakeholder of the project. In an embodiment, the baseline value is based upon allowable defect count corresponding to the project effort as below:

Baseline Value=Allowable defect count based on the project effort(any Project manager may determine based on technology or past experience) (2)

In one embodiment, if Actual Value≤Baseline value, the effectiveness is considered to be exceeding and/or meeting expectations associated with the quality control activities, whereas if Actual Value>Baseline value, the effectiveness is considered failing to exceed and/or meet expectations associated with the quality control activities. The outcome of the effectiveness (i.e. meeting or failure to meet expectations) may be indicated with colors on the user interface, the stakeholders are aware about the capabilities of each quality control manager. The aforementioned description for computing the effectiveness of each quality control manager is illustrated in FIG. 5(c).

Figure 5C:
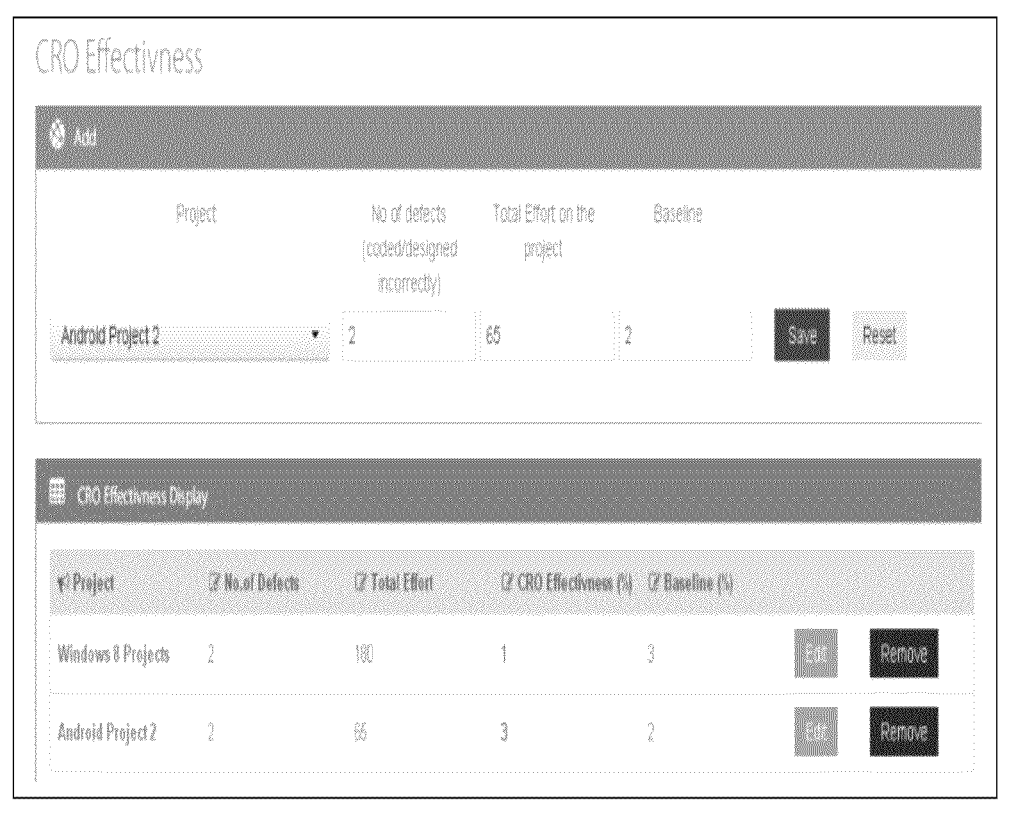

It may be understood from the FIG. 5(c) that the computation module 223 may receive a defect count, a project effort value and a baseline value, corresponding to the software application to be review, from each quality control manager. As illustrated in the figure, that a defect count, the project effort value and the baseline value are 2, 65, and 2 respectively received corresponding to "Android Project 2". Upon receiving, the defect count, the project effort value and the baseline value may be stored in the database 226 when clicked on a 'save' button. Thereafter, the computation module 223 may calculate the effectiveness corresponding to each quality control manager based on the equations (1) and (2). Upon calculating the effectiveness, the effectiveness may then be stored in the database 226 for future reference. In one aspect, when the effectiveness is less than the baseline value, the effectiveness is highlighted in "Red" color or else in "Green" color. Since the effectiveness corresponding to a quality control manager is 3 which is greater than the baseline value i.e. 2, the effectiveness is highlighted in "Red" color. Similarly, the effectiveness corresponding to a quality control manager is 1 which is less than the baseline value i.e. 3, the effectiveness is highlighted in "Green" color. It may be understood that since the effective is stored in the database, the at least one stakeholder may be able to view the effectiveness for previously executed projects for evaluation purpose.

Figure 5D:
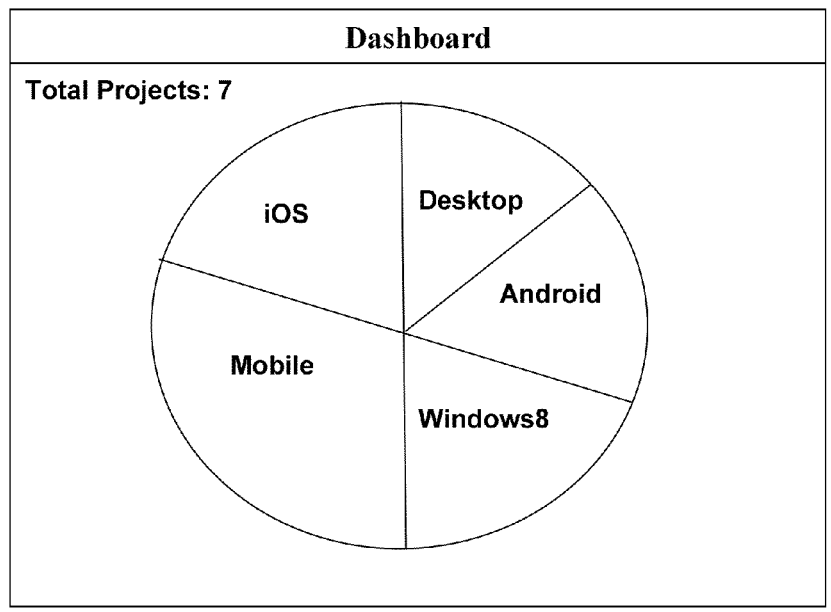

Now referring to FIG. 5(d) illustrating the dashboard that facilitates the at least one stakeholder to trace the status of a plurality of software applications under review. It may be observed from that the at least one stakeholder may check the status of review pertaining to a software application, of the plurality of software applications, through a representation chart. The representation chart may include, but not limited to a pie chart, a bar chart, and a line chart. In one aspect, the representation chart may include a plurality of segments wherein each of the plurality of segments indicates a software application pertaining to a specific domain. Upon clicking on a segment, of the plurality of segments, the dashboard further illustrates the details corresponding to the software application for which the at least one stake holder wishes to check the details.

As illustrated in the FIG. 5(d), the representation chart, represented in the form of pie chart, represents 5 software applications including iOS, Desktop, Android, Windows8, and Mobile. It may be understood that, out of the 5 software applications, the at least one stakeholder may click on the segment of the pie chart corresponding to the software application related to the 'Mobile' domain. Upon clicking the segment, all the software applications related to the domain of the 'Mobile' are displayed on the dashboard. Based on the displaying of the software applications, the at least one stakeholder may then be able to check the details of each of the software application pertaining to the 'mobile' domain. The details may include amount of review performed for the Mobile software application, and release date. Based on the details, the at least one stakeholder may take necessary steps in order to assure the quality of the software application before deployment. Thus, in this manner, the quality of the software application may be traced and thereby assured.

Figure 6:
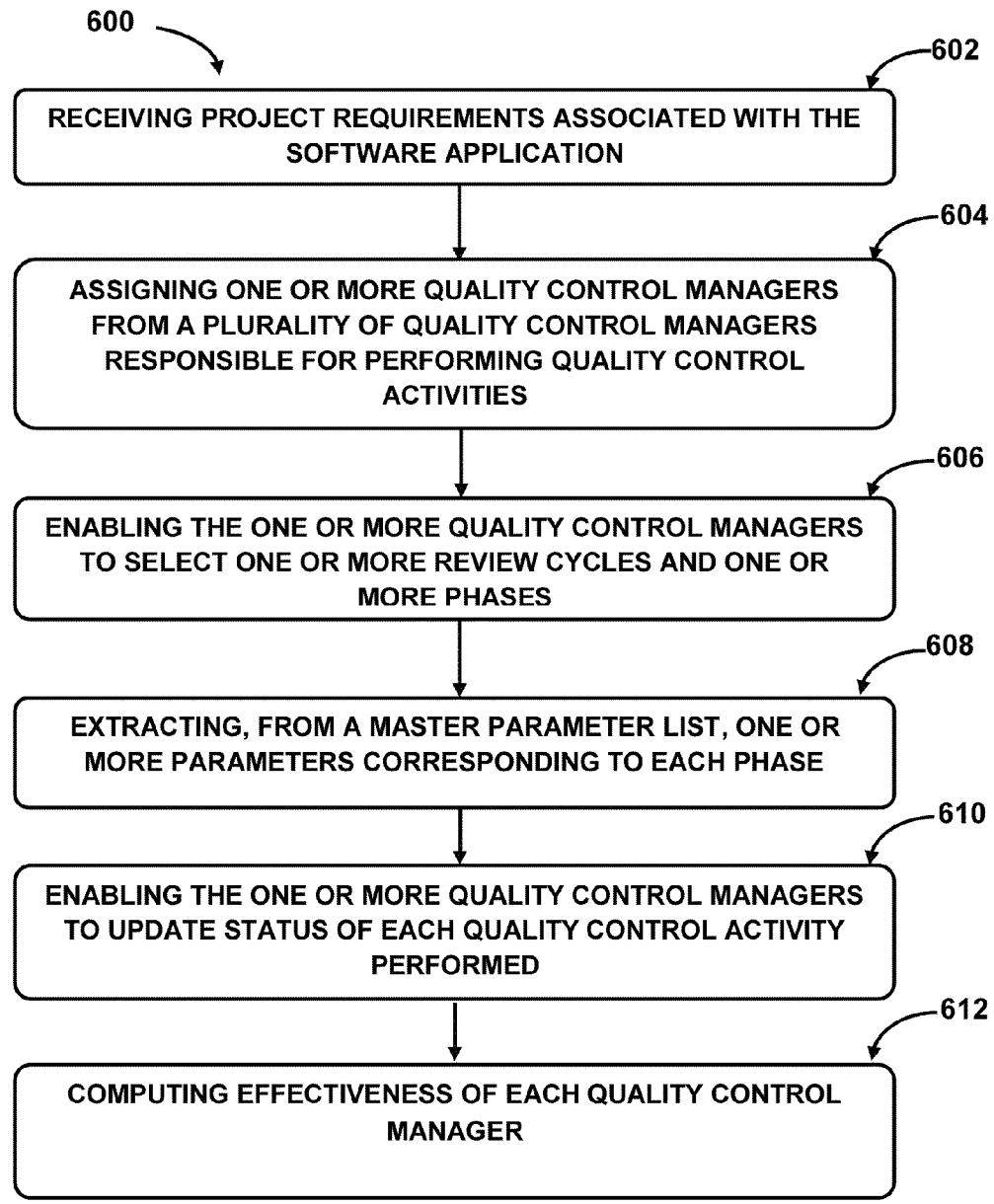
FIG. 6 illustrates a method for facilitating quality assurance of a software application, in accordance with an embodiment of the present disclosure.

Referring now to FIG. 6, a method 600 for facilitating quality assurance of a software application is shown, in accordance with an embodiment of the present disclosure. The method 600 may be described in the general context of computer executable instructions. Generally, computer executable instructions can include routines, programs, objects, components, data structures, procedures, modules, functions, etc., that perform particular functions or implement particular abstract data types. The method 600 may be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the disclosure described herein. Furthermore, the method can be implemented in any suitable hardware, software, firmware, or combination thereof. However, for ease of explanation, in the embodiments described below, the method 600 may be considered to be implemented in the above described in the system 102.

At block 602, project requirements associated with the software application may be received. In one implementation, the project requirements may be received by the data receiving module 212.

At block 604, one or more quality control managers from a plurality of quality control managers responsible for performing the quality control activities may be assigned. In one aspect, the one or more quality control managers may be assigned by mapping the project requirements with the profile information of the plurality of quality control managers and selecting the one or more quality control managers for performing the quality control activities. In one implementation, the one or more quality control managers may be assigned by the assigning module 214.

At block 606, the one or more quality control managers may be enabled to select one or more review cycles associated with the quality control activities to be performed corresponding to the software application. The one or more quality control managers may further enabled to select one or more phases of a plurality of phases corresponding to each review cycle of the one or more review cycles. In one aspect, each phase is associated with software development life cycle (SDLC) of the software application. In one implementation, the selection of one or more review cycles and the selection of the one or more phases may be enabled by the selection module 216.

At block 608, one or more parameters corresponding to each phase may be extracted from a master parameter list stored in the database 226. In one aspect, the one or more parameters may facilitate the one or more quality control managers to perform the quality control activities. In one implementation, the one or more parameters may be extracted by the extraction module 218.

At block 610, the one or more quality control managers may be enabled to update status of each quality control activity performed. The status may be updated in the database 226. The updating of the status facilitates in completion of the quality assurance of the software application. In one implementation, the one or more quality control managers may be enabled to update the status by the update module 220.

At block 612, effectiveness of each quality control manager may be computed after receiving the signoff from at least one stakeholder. In one implementation, the effectiveness may be computed by the computation module 223.

Although implementations for methods and systems for facilitating quality assurance of a software application have been described in language specific to structural features and/or methods, it is to be understood that the appended claims are not necessarily limited to the specific features or methods described. Rather, the specific features and methods are disclosed as examples of implementations for facilitating the quality assurance of the software application.

Exemplary embodiments discussed above may provide certain advantages. Though not required to practice aspects of the disclosure, these advantages may include those provided by the following features.

Some embodiments enable a system and a method to identify subject matter expert (SME), responsible for assuring quality of a software application, corresponding to one or more technologies used for developing a software application.

Some embodiments enable a system and a method to define a checklist related to standards practices for reviewing each segment of SDLC such as requirement gathering and analysis, system analysis, system design, coding, testing, implementation, and maintenance.

Some embodiments enable a system and a method to publish a review plan with a number of cycles, selected by a quality control manager, of review. The review plan facilitates respective stakeholders to track the progress of review corresponding to each segment of the SDLC effectively.

Some embodiments enable a system and a method to obtain a signoff the respective stakeholders after successful completion of all cycles of review. The signoff indicates that all the phases of the software application have been reviewed as per the pre-defined standards.

The invention claimed is:

1. A method for facilitating quality assurance of a software application, the method comprising:
   receiving, by a processor, project requirements associated with the software application;
   assigning, by the processor, one or more quality control managers from a plurality of quality control managers responsible for performing quality control activities, and each of the plurality of quality control managers has a profile information, and wherein the one or more quality control managers are assigned by:
   mapping the project requirements with the profile information, and
   selecting, based on the mapping, the one or more quality control managers for performing the quality control activities;
   enabling, by the processor, the one or more quality control managers to select one or more review cycles associated with the quality control activities to be performed corresponding to the software application, and one or more phases of a plurality of phases corresponding to each review cycle of the one or more review cycles, wherein each phase is associated with software development life cycle (SDLC) of the software application;
   extracting, by the processor, one or more parameters corresponding to each phase from a master parameter list stored in a database, wherein the one or more parameters facilitates the one or more quality control managers to perform the quality control activities based on said selected one or more review cycles and phases; and
   enabling, by the processor, the one or more quality control managers to update status of each quality control activity performed, in the database, thereby facilitating the quality assurance of the software application.

2. The method of claim 1, wherein the project requirements comprises application type, domain type, and functional knowledge of the quality control manager.

3. The method of claim 1, wherein the profile information indicates expertise of the one or more quality control managers, and wherein the profile information comprises Java, J2EE, SQL, Struts, Hibernate, Dot net, HTML, XML, FTL, RSS.

4. The method of claim 1, wherein the one or more phases comprise a design traceability phase, a wireframe phase, a user interface phase, a content management system (CMS) phase, java, a service integration phase.

5. The method of claim 1, wherein the one or more parameters comprises one or more predefined standards, related to one or more technologies, provided to the quality control manager for reference.

6. The method of claim 1 further comprising tracing, through a dashboard, the status of the quality control activities being performed by the one or more quality control managers.

7. The method of claim 1 further comprising receiving a signoff indicating completion of the quality control activities to be performed by the one or more quality control managers corresponding to each cycle, wherein the signoff is received from at least one stakeholder.

8. A system for facilitating quality assurance of a software application, the system comprising:
 a processor; and
 a memory coupled to the processor, wherein the processor is capable of executing a plurality of modules stored in the memory, and wherein the plurality of module comprising:
  a data receiving module for receiving project requirements associated with the software application;
  an assigning module for assigning one or more quality control managers from a plurality of quality control managers responsible for performing the quality control activities, and each of the plurality of quality control managers has a profile information, and wherein the one or more quality control managers are assigned by:
   mapping the project requirements with the profile information, and
   selecting, based on the mapping, the one or more quality control managers for performing the quality control activities;
  a selection module for enabling the one or more quality control managers to select one or more review cycles associated with the quality control activities to be performed corresponding to the software application, and one or more phases of a plurality of phases corresponding to each review cycle of the one or more review cycles, wherein each phase is associated with software development life cycle (SDLC) of the software application;
  an extraction module for extracting one or more parameters corresponding to each phase from a master parameter list stored in a database, wherein the one or more parameters facilitates the one or more quality control managers to perform the quality control activities based on said selected one or more review cycles and phases; and
  an update module for enabling the one or more quality control managers to update status of each quality control activity performed, in the database, thereby facilitating the quality assurance of the software application.

9. The system of claim 8 further comprising a dashboard for tracing the status of the quality control activities being performed by the one or more quality control managers.

10. The system of claim 8 further comprising a signoff module for receiving a signoff indicating completion of the quality control activities to be performed by the one or more quality control managers corresponding to each cycle, wherein the signoff is received from at least one stakeholder.

11. A non-transitory computer readable medium embodying a program executable in a computing device for facilitating quality assurance of a software application, the program comprising:
 a program code for receiving project requirements associated with the software application;
 a program code for assigning one or more quality control managers from a plurality of quality control managers responsible for performing the quality control activities, and each of the plurality of quality control managers has a profile information, and wherein the one or more quality control managers are assigned by:
  mapping the project requirements with the profile information, and
  selecting, based on the mapping, the one or more quality control managers for performing the quality control activities;
 a program code for enabling the one or more quality control managers to select one or more review cycles associated with the quality control activities to be performed corresponding to the software application, and one or more phases of a plurality of phases corresponding to each review cycle of the one or more review cycles, wherein each phase is associated with software development life cycle (SDLC) of the software application;
 a program code for extracting one or more parameters corresponding to each phase from a master parameter list stored in a database, wherein the one or more parameters facilitates the one or more quality control managers to perform the quality control activities based on said selected one or more review cycles and phases; and
 a program code for enabling the one or more quality control managers to update status of each quality control activity performed, in the database, thereby facilitating the quality assurance of the software application.

12. The method of claim 1, further comprising computing effectiveness of the one or more quality control managers by quantifying the quality control activities performed by them, and wherein the effectiveness so computed is indicated using colors.

* * * * *